United States Patent [19]

Simson

[11] 4,299,407
[45] Nov. 10, 1981

[54] AUTOMOBILE STEERING MECHANISM

[76] Inventor: Anton K. Simson, 13227 Aubrey St., Poway, Calif. 92064

[21] Appl. No.: 125,718

[22] Filed: Feb. 28, 1980

[51] Int. Cl.³ .............................................. B62D 1/18
[52] U.S. Cl. ................................................... 280/775
[58] Field of Search .................... 180/78, 79; 280/775, 280/1.11 R

[56] References Cited

U.S. PATENT DOCUMENTS

| 3,195,913 | 7/1965 | Hallsworth | 280/775 |
| 3,216,521 | 11/1965 | Ulrich | 280/775 X |
| 3,312,123 | 4/1967 | Rumpf | 280/775 X |
| 3,347,557 | 10/1967 | Cruson | 280/1.11 R |
| 3,927,899 | 12/1975 | Bough | 280/775 |

FOREIGN PATENT DOCUMENTS

| 1101185 | 3/1961 | Fed. Rep. of Germany | 280/775 |
| 883130 | 11/1961 | United Kingdom | 280/775 |
| 1082380 | 9/1967 | United Kingdom | 280/775 |

Primary Examiner—David M. Mitchell
Assistant Examiner—Norman L. Stack, Jr.
Attorney, Agent, or Firm—Henri J. A. Charmasson

[57] ABSTRACT

A steering mechanism where the steering wheel and command console located behind it are mounted on a generally vertical support which can be pivoted about a stationary base on the floor of the vehicle in order to accommodate two side by side driving positions. A separate linkage between the command console and the stationary base keeps the latter at a constant angular position as the steering wheel is shifted between the two driving positions. A choice of gear-and-chain combination or flexible torsion-transmitting rods are disclosed for coupling the steering wheel to the vehicle steering mechanism and for keeping the command console at a constant angular position.

13 Claims, 8 Drawing Figures

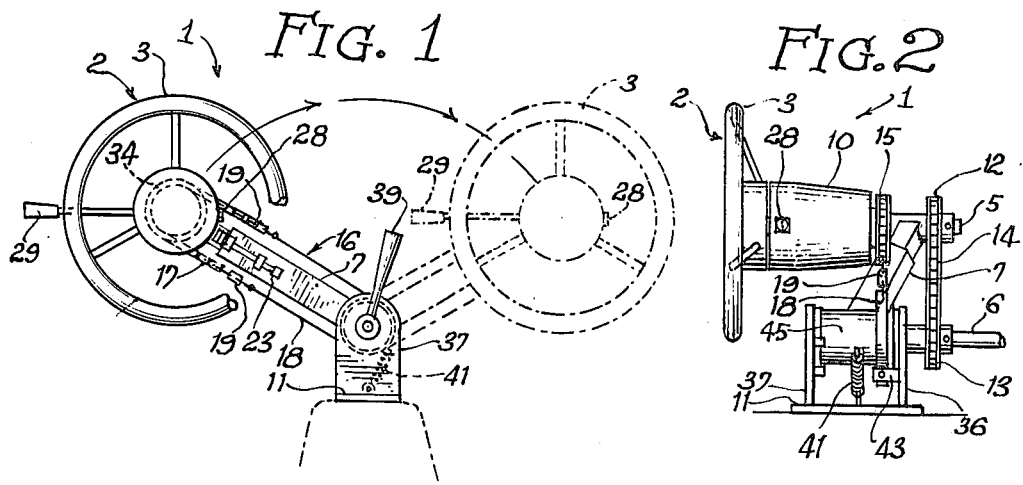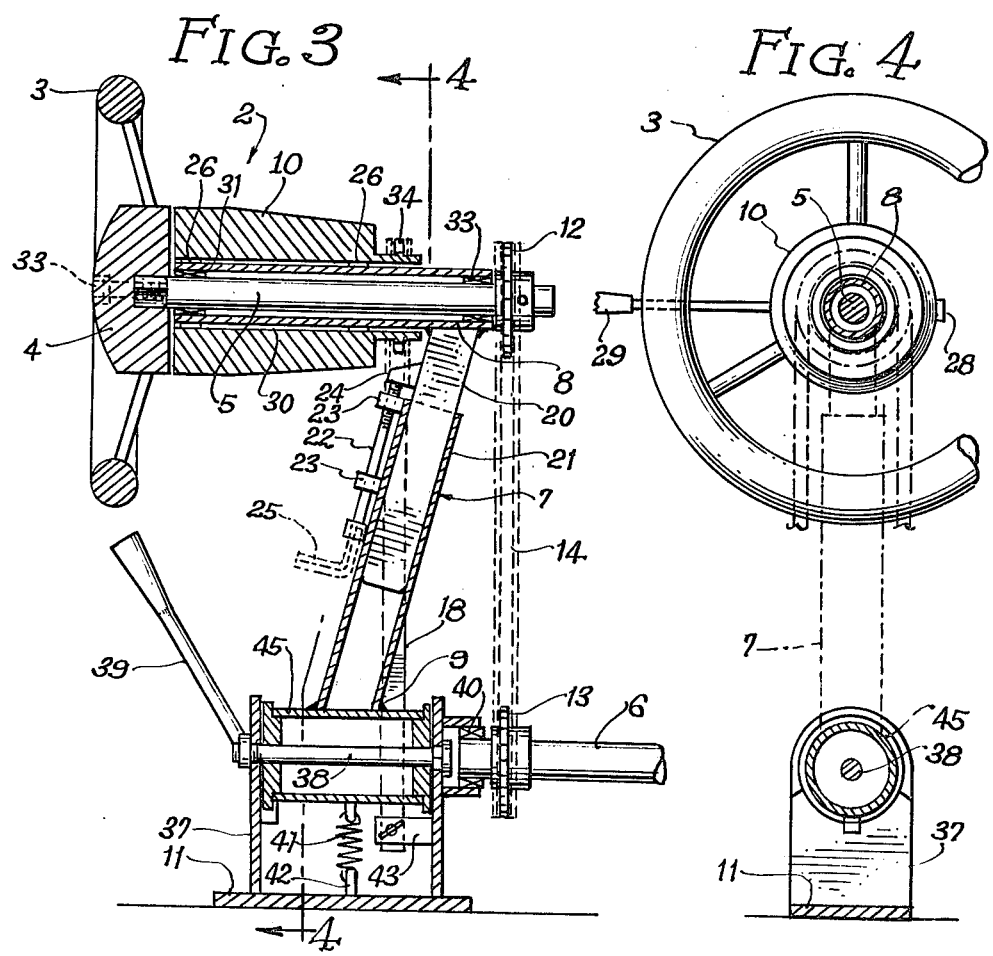

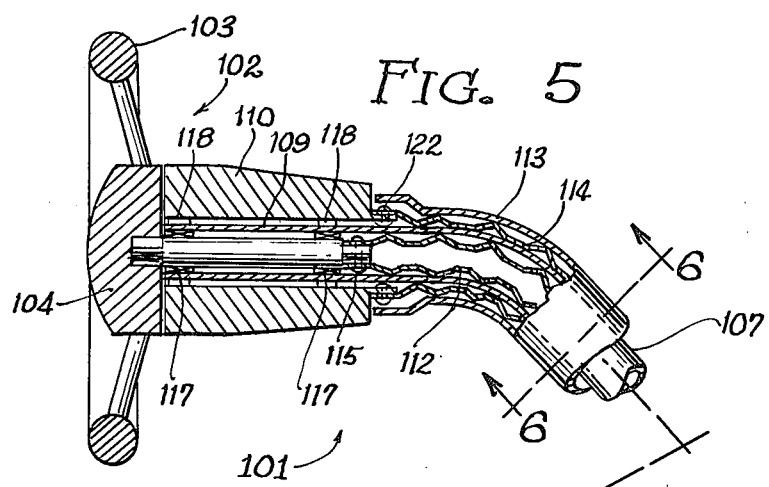
FIG. 5
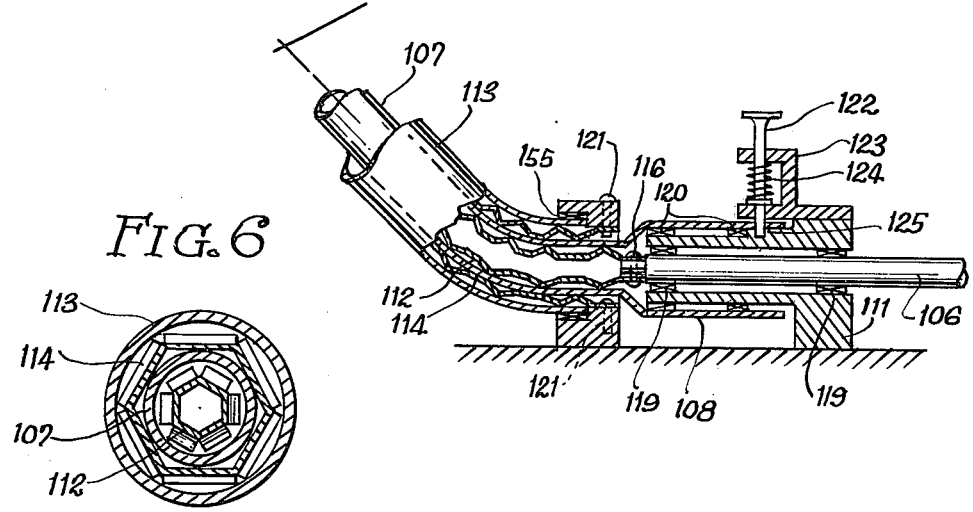
FIG. 6
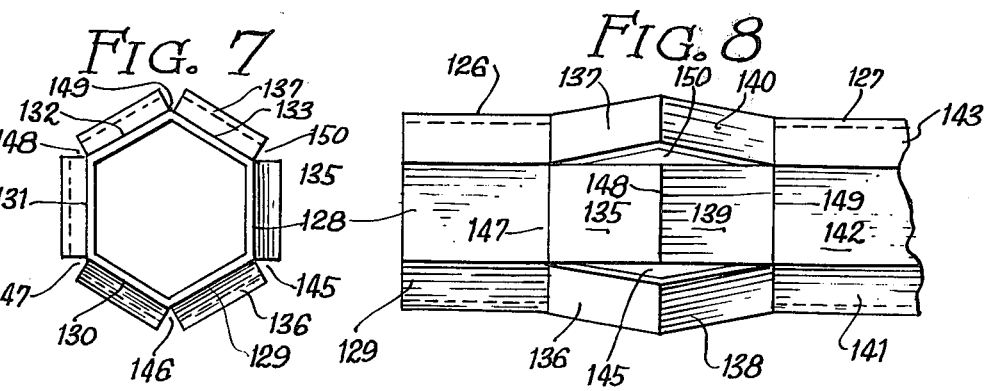
FIG. 7
FIG. 8

AUTOMOBILE STEERING MECHANISM

TECHNICAL FIELD

The invention relates to steering systems for vehicles including accommodation for two side-by-side driving positions in conjunction with two sets of foot pedals. The invention has application in a variety of ways, such as racing events, for example, where fatigue is a critical factor and change of drivers without stopping could be a major advantage. The invention is also applicable to the trucking industry where use of two driver teams is most common. A general use could be realized among the public relative to driver training or long trips in which the occupants do not wish to stop in order to change seats, and to accomodate opposite driving side customs as between the United Kingdom and Continental Europe. The invention also relates to means for transmitting a torsional motion through a winding channel and discloses a substitute for universal joint coupling.

PRIOR ART

The problem of providing for two side-by-side driving positions in a vehicle using the same steering wheel was addressed in U.S. Pat. No. 2,436,153, Sanmori. The disclosed solution was very different from the one disclosed in the present invention invention and somewhat more cumbersome. Rotatable seat and steering column arrangements such as disclosed in U.S. Pat. No. 3,195,913, Hawlsworth, and No. 3,347,557, Grimes, et al, can be listed as a background to the present invention. While the former provides a good example of gear-and-chain combination for transmittal of the torsional force between the steering wheel and the steering yoke of the vehicle, the latter relies upon a standard universal joint arrangement. Due to the fact that these patents reveal steering column assemblies integrated with the driver's seat which swivels about a single axis or pivot point to achieve a complete reversal of the seating position, they do not address the problem of keeping a command console mounted on a steering column at a constant angular position in relation to the driver.

SUMMARY OF THE INVENTION

It is the principal object of this invention to provide a steering column mechanism for automobiles which can be laterally shifted in order to accommodate two side-by-side driving positions. A further object of this invention is to provide for a command console installed behind a steering wheel and around the steering column which is kept at a constant vertical angular position when the steering column is shifted between the two driving positions. It is also the object of this invention to provide a choice of coupling arrangements for transmitting the torsional movement of the steering wheel along a non-linear path down to the main steering shaft. These and other objects of the invention are achieved by a steering wheel and command console arrangement mounted on the top end of a generally vertical support member which is pivotally anchored at its base to the floor of the vehicle at an intermediary location between the two driving positions. Couplings between the steering wheel and the main steering shaft, also between the command console and the anchor base, are provided by a choice between gear-and-chain mechanism or bendable torsion-transmitting rods made from plastic tubing segmented into short sections by providing intermittent peripheral weak points along the plastic tubing which allow for limited lateral flexion without loss of torsional strength.

BRIEF DESCRIPTION OF THE DRAWING

FIG. 1 is a front elevational view of a first embodiment of the invention showing the alternative position of the steering mechanism in broken lines;

FIG. 2 is a right side elevational view thereof;

FIG. 3 is a lateral cross sectional view of the steering mechanism shown in the central, vertical position;

FIG. 4 is a back cross sectional view taken along line 4—4 of FIG. 3;

FIG. 5 is a lateral view of a second embodiment of the invention with cut-out portions showing a cross sectional view of the mechanism;

FIG. 6 is a cross sectional view taken along line 6—6 of FIG. 5;

FIG. 7 is an end view of one of the bendable torque-transmitting shafts used in the second embodiment of the invention; and FIG. 8 is a fragmentary side view of a bendable shaft.

DESCRIPTION OF THE PREFERRED EMBODIMENTS OF THE INVENTION

Referring now to the drawing, there is illustrated in FIGS. 1 through 4 a first embodiment of the invention. The steering wheel assembly 1 comprises the steering wheel 3 mounted on a rotating shaft 5 by pin 33 and supported by a member 7 whose lower part 9 is anchored into a stationary base 11 located on the floor of the vehicle generally between the two driving positions. The steering wheel shaft 5 is engaged into the horizontal tubular end 8 of the supporting member 7 and allowed to rotate therein on ball bearings 31 and 32. A command console 10 is mounted behind the steering wheel 3 and is allowed to rotate freely around the tubular end 8 on the two slip rings 26. The command console 10 is designed to support various controls for the convenience of the driver, including the ignition switch 28 and the turn signal lever 29. A first spur gear 12 is mounted on the back end of the steering wheel shaft 5. A second spur gear 34 is mounted on the back end of the command console. The first spur gear 12 is coupled by a chain 14 to a third spur gear 13 mounted at the end of the main steering rod 6 which is supported on the stationary bse 11 by ball bearings 40. The support member 7 is made of two telescopically engaged segments 20 and 21. A tensioning screw 22 mounted through the threaded eyelets 23 associated with segment 21 pushes against block 24 welded to segment 20, thus providing a means for tensioning the chain 14 by means of a wrench 25 shown engaged in the head of the crew 22. The lower end of the supporting member 7 is welded to a horizontal cylinder 9 engaged on a threaded shaft 38 between a vertical support plate 36 and a clamping plate 37. A hand-operated lever 39 engages the threaded shaft 38. The back plate 36, the clamping plate 37, the threaded shaft 38 and lever 39 form a vice which can be used to immobilize the steering column assembly in the desired position. A spring 41, hung between the stationary base 11 and the lowermost part of the cylinder 9 when the steering assembly is in the vertical position, is stretched every time the steering assembly is shifted either to the right or to the left of the central vertical position. The tension of the coil spring 41 acts as a counterweight to help the driver in lifting the steering assembly 2 from one of the extreme lateral positions toward the center, and to restrain the fall of the steering mechanism 2 into the alternate driving position. A chain 17 wraps around the console 10 engaging the second spur gear 34 and is coupled midway down along the supporting element 7 on both sides to a belt 18 which is permanently attached at the lower end to a projection 43 on the back plate 36 of the stationary base 11. The belt 18 is not allowed to slip around its anchor point 43 but partially wraps around the cylinder 9 at the lower end of the supporting member 7. The chain 17 is attached to the belt 18 by a pair of turn buckles 19 used for tension adjustment and/or for leveling the command console 10. It can be understood that since the second spur gear 34 is fixedly attached to the command console 10 and the belt 18 is anchored to the stationary base 11, there is created a form of parallelogram linkage between the command console 10 and the stationary base 11 which keeps the command console 10 at a constant angular position in relation to the drivers. This arrangement keeps, for instance, the turn signal lever 29 at a constant horizontal position and the ignition switch 28 conveniently at a three O'clock position.

A second embodiment 101 of the invention is illustrated in FIGS. 5 through 8. In this configuration, the principal structural element for the steering wheel assembly 102 is a tubular support member 107 which has been bent in a dog-leg shape. The upper horizontal end 109 supports the steering wheel 103 and command console 110, while the lower end is pivotally connected to a stationary base 111 on the floor of the vehicle. The steering wheel 103 drives a short shaft 105 which is coaxially mounted into the upper end of the tubular support member 107 on ball bearings 117. The command console 110 designed to carry various controls for the convenience of the driver is mounted behind the steering wheel 104 around the tubular support member about which it can rotate on two sets of slip rings 118. The enlarged area 108 at the lower end of the tubular element 107 is free to rotate on slip rings 120 around the stationary base 111 which support the end of the main steering column rod 106 between bearings 119. A spring-loaded pin 122 mounted on a bracket 123 of the stationary base 111 cooperates with perforations on the enlarged end 108 and with a hole 125 to provide a locking mechanism to immobilize the steering column assembly 121 to the desired driving position. The spinning movement of the steering wheel 103 is carried down the interior of the dog-leg-shaped channel constituted by a tubular support member 107, and to the main steering rod 106 by way of a bendable torque-transmitting rod 112 whose upper extremity is attached to steering wheel shaft 105 by pin 115 and whose lower extremity is attached to the main steering rod 106 by pin 116. A second bendable torsion-transmitting rod 114 is mounted coaxially around the supporting member 107 and is connected at its upper extremity to the command console by pins 122, and to the stationary base 11 at its lower extremity by pins 121. An external sleeve 113 unsecured at its upper end is free to rotate about the stationary base between slip rings 145. The sleeve 113 is suggested for both aesthetic and protective reasons. The outer bendable torsion-transmitting rod 114 is designed to keep the command console 110 at a constant angular position in relation to the drivers regardless of the pivotal position of the steering column assembly. The geometry of the bendable torsion-transmitting rods 112 and 114 is more specifically illustrated in FIGS. 7 and 8.

The bendable rod is made from a polyethylene tubular extrusion having a polygonal cross section. In the illustrated embodiment, the tubular extrusion has a hexagonal cross section defining six sides 128 through 133. Intermittently along the tubular extrusion longitudinal slits 145 through 150 have been cut peripherally along each angle. Each strip of material between the two adjacent slits 145 and 150 have been folded, first outwardly along a transversal line 147 joining the beginning of the slits, then inwardly along a transversal line 148 joining the median point of the slits, then outwardly again along a transversal line 149 joining the ends fo the slits. In order to facilitate the folding of the material along lines 147, 148 and 149, small grooves may be cut into the polyethylene material in order to create weak points along those lines. This process yields a multiplicity of rigid segments 126, 127 joined end-to-end by expanded links having some lateral flexibility while maintaining torsional rigidity. More specifically, the flexible joint between two rigid segments 126, 127 comprises for each side of the tubular polygonal extrusion, a projection 135 extending outwardly from the leading edge of the first segment 126 and pivotally connected thereto; a second projection 139 extending outwardly from the trailing edge of the next rigid segment 127 and pivotally connected thereto; and, a pivotal joint along line 148 of the two outwardly extending projections 135 and 139. The polygonal configuration of the illustrated embodiment is merely suggestive. A higher degree of flexibility could be obtained by increasing the number of sides of the tubular cross section, at the expense of its torsional rigidity. A pentagonal or hexagonal configuration has been found to be adequate for the present application. It should be understood that the thickness of the material and its inherent strength are important factors in determining the torsional strength and lateral flexibility of the structure.

The bendable rod 112 or 114 in conjunction with its rigid tubular member 107 (mounted either internally or externally) constitutes the means for transmitting rotational motion around the predetermined bends of the rigid tubular member 107. The latter provides the necessary support to prevent the collapse of the bendable rod 112 or 114 while allowing its required deflection around the bends or turns.

While I have described the preferred embodiments of the invention and suggested modifications thereto, other embodiments may be designed and other changes may be made without departing from the spirit of the invention and the scope of the appended claims.

What is claimed is:

1. A steering wheel assembly which can be shifted laterally in order to accommodate at least two side by side driving positions, and means for coupling said steering wheel to a main steering rod, said assembly and means comprising:
   a shaft driven by the steering wheel;
   an elongated support member having its lower end pivotally connected to a stationary base, and its upper end pivotally connected to the shaft;
   a console rotatingly mounted around the shaft;
   means for linking the shaft to the main steering rod; and
   means for holding the console at a constant angular position in relation to the base when the support member is pivoted around its lower end, and when said steering wheel and shaft is rotated.

2. The structure claimed in claim 1 wherein said means for linking comprises:
at least two circular rotating driving elements; and
means for peripherally coupling one of said circular elements to another.

3. The structure claimed in claim 1 wherein said means for linking comprises a bendable torsion transmitting rod having one extremity coupled to the shaft and the opposite extremity coupled to the main steering rod.

4. The structure claimed in claim 1 wherein said means for holding comprises means for keeping at least one location on the console at a constant radial distance from a virtual pivotal point distal from the pivotal axis of said support member when said steering assembly is shifted laterally.

5. The structure claimed in claim 1 wherein said means for holding comprises a bendable torsion-transmitting rod having one extremity coupled to the console and the opposite extremity coupled to the stationary base.

6. The structure claimed in claim 2 wherein:
said circular rotating elements comprise a first spur gear coaxially mounted on the shaft, and a second spur gear coaxially mounted on the steering column; and
said means for peripherally coupling comprise a transmission chain engaging said first and second spur gears.

7. The structure claimed in claim 4 wherein said means for keeping comprise a flexible elongated tension-transmitting element having both of its extremities fixedly attached to the stationary base and its median section intimately wrapped around said console.

8. A steering wheel assembly which can be shifted laterally in order to accommodate at least two side-by-side driving positions, and means for coupling said steering wheel to a main steering rod, said assembly and means comprising:
a shaft driven by the steering wheel;
an elongated support member having its lower end pivotally connected to a stationary base, and its upper end pivotally connected to the shaft;
a console rotatingly mounted around the shaft;
means for linking the shaft to the main steering rod, said means for linking comprising a bendable torsion transmitting rod having one extremity coupled to the shaft and the opposite extremity coupled to the main steering rod;
means for holding the console at a constant angular position in relation to the base when the support member is pivoted around its lower end;
wherein said torsion transmitting rod comprises:
a plurality of rigid sections;
means for articulately connecting two adjacent sections end-to-end;
each said rigid section comprising a tubular segment having a polygonal cross-section whereby said segment has a multiplicity of flat sides;
said means for articulately connecting comprising:
a first projection extending outwardly from the leading edge of each one of at least three of the flat sides of a first section, said projection being pivotally connected at one end along said leading edge;
a second projection extending outwardly from the trailing edge of one of at least three flat sides of a second section, said second projection being pivotally connected at one end along said trailing edge;
the other ends of said first and second projections being pivotally connected to each other.

9. A steering wheel assembly which can be shifted laterally in order to accommodate at least two side-by-side driving positions, and means for coupling said steering wheel to a main steering rod, said assembly and means comprising:
a shaft driven by the steering wheel;
an elongated support member having its lower end pivotally connected to a stationary base, and its upper end pivotally connected to the shaft;
a console rotatingly mounted around the shaft;
means for linking the shaft to the main steering rod; and
means for holding the console at a constant angular position in relation to the base when the support member is pivoted around its lower end, said means for holding comprising a bendable torsion-transmitting rod having one extremity coupled to the console and the opposite extremity coupled to the stationary base;
said torsion transmitting rod comprising a plurality of rigid sections and means for articulately connecting two adjacent sections end to end;
wherein:
each said rigid section comprises a tubular segment having a polygonal cross-section whereby said segment has a multiplicity of flat sides;
said means for articulately connecting comprise:
a first projection extending outwardly from the leading edge of each of one of at least three of the flat sides of a first section, said projection, being pivotally connected at one end along said leading edge;
a second projection extending outwardly from the trailing edge of one of at least three flat sides of a second section, said second projection being pivotally connected at one end along said trailing edge;
the other ends of said first and second projection being pivotally connected to each other.

10. The structure claimed in claim 8 or claim 9 wherein said elongated support is a dog-leg shaped tubular column having its lower end rotatingly attached to the stationary base and its upper end coaxially and rotatingly attached to the steering wheel shaft;
said means for linking is a first bendable tension transmitting rod coaxially held inside said tubular column; and
said means for holding is a second bendable tension transmitting rod coaxially held around said tubular column.

11. The structure claimed in claim 10 wherein said bendable torsion transmitting rod is made from a tubular plastic extrusion having a polygonal cross section of at least five sides;
said tubular extrusion having intermitent longitudinal slits along its edges and transversal grooves across its sides, said grooves bridging the beginning, midsection, and end of each pair of adjacent slits, said groove being dimensioned and shaped to create a weak, pliable line.

12. A steering wheel assembly which can be shifted laterally in order to accomodate at least two side-by-side driving positions, and means for coupling said steering wheel to a main steering rod, said assembly and means comprising:
a shaft driven by the steering wheel;

a stationary base;

an elongated support member having its lower end pivotally connected to said stationary base, and its upper end pivotally connected to the shaft;

a console rotatingly mounted around the shaft;

means for linking the shaft to the main steering rod;

means for holding the console at a constant angular position in relation to the base when the support member is pivoted around its lower end, said means for holding comprising;

means for keeping at least one location on the console at a constant radial distance from a virtual pivotal point distal from the pivotal axis of said support member when said steering assembly is shifted laterally;

said means for keeping comprising a flexible elongated tension-transmitting element having both of its extremities fixedly attached to the stationary base and its median section intimately wrapped around said console;

said stationary base comprising:

a generally flat vertical mounting plate;

a threaded shaft extending horizontally from said mounting plate, said threaded shaft pivotally engaging the lower end of the support member;

a generally flat clamping plate extending vertically from said base and parallel to the mounting plate, said clamping plate having a hole engaging said threaded shaft, whereby the lower end of the support member is placed between the mounting plate and the clamping plate; and lever means coupled with the threaded shaft for pushing the clamping plate toward the mounting plate in a vice-like action against the lower end of the support member.

13. The structure claimed in claim 9 wherein;

said means for linking comprises a second bendable torsion-transmitting rod having one extremity coupled to the shaft and the opposite extremity coupled to the main steering rod;

said second torsion transmitting rod being substantially similar to said means for holding and mounted coaxially within it.

* * * * *